(12) United States Patent
Mizutani et al.

(10) Patent No.: US 7,969,056 B2
(45) Date of Patent: *Jun. 28, 2011

(54) ROTATING ELECTRIC MOTOR

(75) Inventors: Ryoji Mizutani, Nishikamo-gun (JP); Kazutaka Tatematsu, Nagoya (JP); Eiji Yamada, Owariasahi (JP); Nobuyuki Matsui, Nagoya (JP); Takashi Kosaka, Nagoya (JP)

(73) Assignees: Toyota Jidosha Kabushiki Kaisha, Aichi-ken (JP); National University Corporation Nagoya Institute of Technology, Aichi-ken (JP)

( * ) Notice: Subject to any disclaimer, the term of this patent is extended or adjusted under 35 U.S.C. 154(b) by 81 days.

This patent is subject to a terminal disclaimer.

(21) Appl. No.: 12/519,079

(22) PCT Filed: Jan. 29, 2008

(86) PCT No.: PCT/JP2008/051717
§ 371 (c)(1), (2), (4) Date: Jun. 12, 2009

(87) PCT Pub. No.: WO2008/093865
PCT Pub. Date: Aug. 7, 2008

(65) Prior Publication Data
US 2010/0019606 A1    Jan. 28, 2010

(30) Foreign Application Priority Data
Jan. 30, 2007    (JP) ................................ 2007-019346

(51) Int. Cl.
H02K 1/22    (2006.01)
H02K 21/04    (2006.01)

(52) U.S. Cl. ............... 310/156.07; 310/156.49; 310/181

(58) Field of Classification Search ......... 310/156.07–156.011, 156.48–156.54, 310/49.32, 49.36, 49.39, 216.004, 216.57, 310/216.066, 261.1, 181
See application file for complete search history.

(56) References Cited

U.S. PATENT DOCUMENTS
3,334,254 A * 8/1967 Kober ...................... 310/156.07
(Continued)

FOREIGN PATENT DOCUMENTS
JP    6-351206 A    12/1994
(Continued)

OTHER PUBLICATIONS

Jin Zheguo, et al. "Some Investigations into Performance of Hybrid Motor with a Novel Construction", Proceedings of National Conference of IEE of Japan, 2005, 4 pages, with Partial English Translation.

(Continued)

Primary Examiner — Tran N Nguyen
(74) Attorney, Agent, or Firm — Sughrue Mion, PLLC

(57) ABSTRACT

A rotating electric motor includes a stator core, a rotational shaft capable of rotation, a field yoke allowing a flow of magnetic flux in an axial direction, first and second rotor cores fixedly installed on the rotational shaft, a first magnet fixedly installed between the first rotor core and the second rotor core, a first rotor teeth formed at the first rotor core, a second magnet provided alongside of the first rotor teeth in the circumferential direction of the first rotor core, a second rotor teeth formed at the outer surface of the second rotor core, protruding outwardly in the radial direction, a third magnet provided alongside of the second rotor core in the axial direction, and windings that can control the density of magnetic flux between at least one of the first rotor core and second rotor core and the stator core.

5 Claims, 11 Drawing Sheets

U.S. PATENT DOCUMENTS

| | | | |
|---|---|---|---|
| 5,530,307 A | 6/1996 | Horst | |
| 5,672,926 A * | 9/1997 | Brandes et al. | 310/181 |
| 5,682,073 A | 10/1997 | Mizuno | |
| 6,552,459 B2 * | 4/2003 | Burton | 310/156.08 |
| 6,844,645 B2 * | 1/2005 | Maslov et al. | 310/156.12 |
| 7,064,466 B2 * | 6/2006 | Kusase | 310/156.66 |
| 7,755,243 B2 * | 7/2010 | Mizutani et al. | 310/216.007 |

FOREIGN PATENT DOCUMENTS

| | | |
|---|---|---|
| JP | 7-288960 A | 10/1995 |
| JP | 7-336980 A | 12/1995 |
| JP | 2002-78306 A | 3/2002 |
| JP | 2005-65385 A | 3/2005 |
| JP | 2006-271031 A | 10/2006 |

OTHER PUBLICATIONS

Yoshiaki Kano, et al.,"Some Considerations on Simple Non-Linear Magnetic Analysis-Based Optimum Design of Multi-Pole Permanent Magnet Machines", IEEJ Trans. IA, 2003, pp. 196-203, vol. 123, No. 3, with English Abstract.

* cited by examiner

ROTATING ELECTRIC MOTOR

TECHNICAL FIELD

The present invention relates to rotating electric motors.

DESCRIPTION OF THE BACKGROUND ART

Conventionally, a permanent magnet type motor having a permanent magnet disposed at the rotor is employed in various fields, and used as a driving source for electric vehicles and hybrid vehicles.

For the driving source of such electric vehicles and hybrid vehicles, the vehicle running performance of low revolution-high power and high revolution-low power is required.

The torque produced by the motor generally depends upon the magnetic flux flowing to the stator from the rotor and the armature current flowing to the stator winding.

The magnetic flux flowing across the stator and rotor is determined by the employed magnet and the like. The magnetic flux is maintained constant independent of the rotational speed. The rotational speed is determined by the armature current. However, since the armature current is determined depending upon the voltage from the power source such as an inverter, the speed of revolution becomes highest when the voltage of the armature winding matches the maximum voltage of the power supply voltage.

When constant power driving is to be conducted based on a constant power supply voltage in such a permanent magnet type motor, various methods are proposed for the purpose of further increasing the aforementioned highest speed of revolution to improve the running performance as well as to increase the power at a low revolution speed, such as the so-called "field weakening control" and "field strengthening control" (Japanese Patent Laying-Open Nos. 2005-65385, 6-351206, 7-336980, 2002-78306, and 7-288960, as well as; "Some Considerations on Simple Non-Linear Magnetic Analysis-Based Optimum Design of Multi-pole Permanent Magnet Machines" by Yoshiaki Kano, Takashi Kosaka, and Nobuyuki Matsui in IEEJ Trans. IA, Vol. 123, No. 3, pp. 196-203 (2003) (hereinafter, referred to as Non-Patent Document 1); and "Some Investigations into Performance of Hybrid Motor with Novel Construction" by Jin Zheguo, Takashi Kosaka, and Nobuyuki Matsui in the Proceedings of National Conference of the IEE of Japan 2005 (hereinafter, referred to as Non-Patent Document 2).

For example, Non-Patent Documents 1 and 2 propose a hybrid motor based on a combination of a powder-molded magnetic element and a toroidal field coil for a multi-pole permanent magnet.

The hybrid motor disclosed in Non-Patent Documents 1 and 2 includes two rotor cores fixedly installed on the rotational shaft with a distance therebetween, a ring magnet fixedly installed on the rotational shaft located between the rotor cores, and a toroidal field coil.

On the surface of each rotor core are formed a plurality of rotor teeth protruding outwards, and a recess located between each of the rotor teeth.

In this hybrid motor, the magnetic flux for rotating the rotor by the flow of the magnetic flux from the ring magnet running between the rotor and stator, and the magnetic flux generated by the supply of current to the toroidal field coil contribute to the rotor rotation.

However, it has become difficult for the hybrid vehicles disclosed in Non-Patent Documents 1 and 2 to generate sufficient magnetic flux to cause the rotor to rotate at high speed of a level that allows usage as a driving force of the hybrid vehicle and electric car based on the magnetic flux from the toroidal field coil and ring magnet.

DISCLOSURE OF THE INVENTION

In view of the foregoing, an object of the present invention is to provide a rotating electric motor that can carry out "field weakening control" and "field strengthening control", and that can achieve high speed rotation of a level capable of being used as a driving source for a hybrid vehicle, an electric vehicle, and the like.

A rotating electric motor according to the present invention includes a stator core formed in a cylindrical configuration, a rotational shaft disposed in the stator core in a rotatable manner, and a field yoke provided at a perimeter of the stator core, and extending from one end to the other end of the stator core in an axial direction, allowing a flow of magnetic flux in the axial direction of the stator core. A first rotor core, and a second rotor core fixedly installed on the rotational shaft, spaced apart from the first rotor core in the axial direction of the rotational shaft, are provided for the rotational shaft. At the region of the rotational shaft located between the first and second rotor cores is provided a first magnet having a pair of magnetic poles aligned in the axial direction of the rotational shaft. At the outer surface of the first rotor core are provided a first rotor teeth protruding outwardly in the radial direction, and a second magnet provided alongside of the first rotor teeth in the circumferential direction of the first rotor core. At the outer surface of the second rotor teeth and deviated from the first rotor teeth in the circumferential direction of the second rotor core is provided a second rotor teeth protruding outwardly in the radial direction. Also, a third magnet is provided alongside of the second rotor teeth in the circumferential direction of the second rotor core. The rotating electric motor includes a winding allowing control of density of the magnetic flux between at least one of the first and second rotor cores and the stator core by selectively forming a first magnetic circuit and a second magnetic circuit. The first magnetic circuit having a path miming through the first rotor core in the axial direction, arriving at the field yoke, passing through the field yoke, and running through the second rotor core in the axial direction from an end of the second rotor core. The second magnetic circuit includes at least one of a path arriving at the stator core from the first rotor teeth via an air gap, and a path from the stator core, arriving at the second rotor teeth via the air gap.

Preferably, the second and third magnets are arranged such that the polarity at the outer circumferential face of the second magnet differs from the polarity at the outer surface of the third magnet.

Preferably, the second magnet extends from one end to the other end of the first rotor core in the axial direction, and the third magnet extends from one end to the other end of the second rotor core in the axial direction. Preferably, the first rotor core includes a first outer side rotor core in cylindrical form, and a first inner side rotor core provided at the inner circumference of the first outer side rotor core, having magnetic reluctance in the axial direction smaller than the magnetic reluctance of the first outer side rotor core in the axial direction. The second rotor core includes a second outer side rotor core in cylindrical form, and a second inner side rotor core provided at the inner circumference of the second outer side rotor core, having magnetic reluctance in the axial direction smaller than the magnetic reluctance of the second outer side rotor core in the axial direction. Preferably, the first inner side rotor core and second inner side rotor core include a unified magnetic material in the axial direction of each rotor core. The first outer side rotor core and second outer side rotor core are formed having a plurality of magnetic steel plates stacked in the axial direction of each rotor core.

According to the rotating electric motor of the present invention, the first and second rotors can be rotated by the magnetic force from the first magnet fixedly installed on the rotational shaft as well as from the second and third magnets provided at the first and second rotor cores. By virtue of the present rotating electric motor, the so-called "field strengthening" can be implemented by increasing the density of the magnetic flux that is generated between at least one of the first and second rotors and the stator by adjusting the current supplied to the winding. In addition, by adjusting the current supplied to the winding according to the present rotating electric motor, the so-called "field weakening control" in which the magnetic flux generated between at least one of the first and second rotors and the stator is reduced can be implemented by the passage of a portion of the magnetic flux generated from the first magnet running through one of the first and second rotors and then the field yoke to the other of the first and second rotors.

It is to be noted that two or more of the configurations set forth above may be combined appropriately.

BEST MODES FOR CARRYING OUT THE INVENTION

Figure 1:
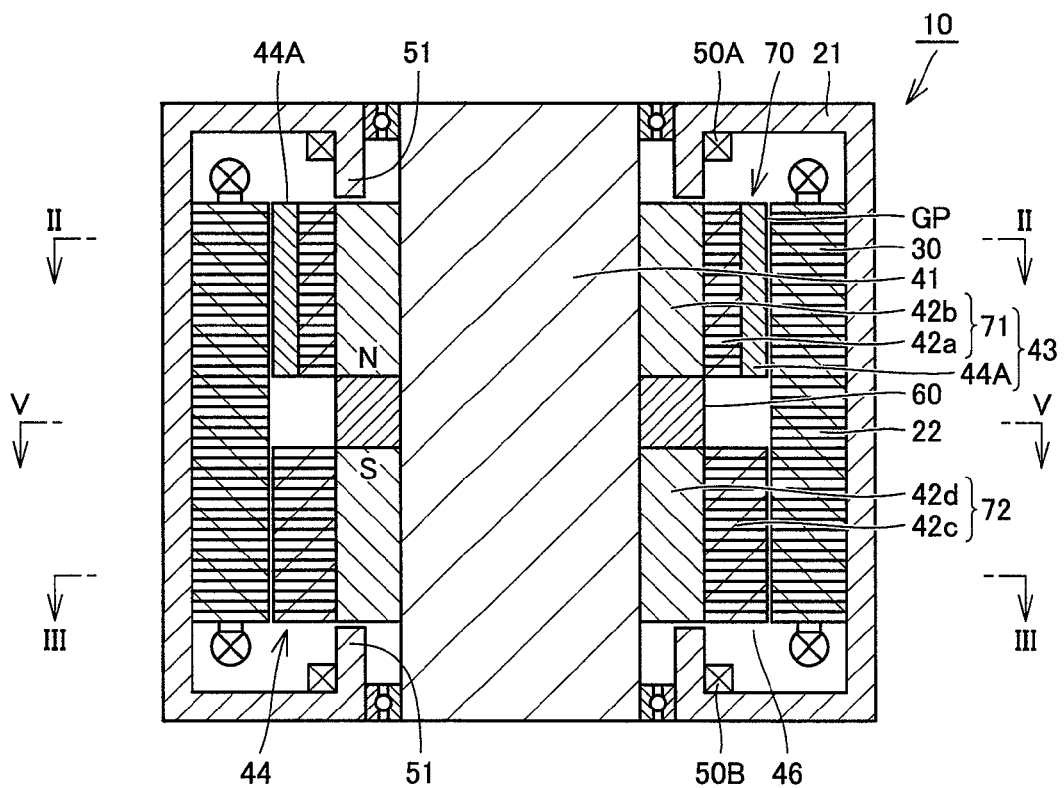
FIG. 1 is a side sectional view of a rotating electric motor according to an embodiment.

The embodiments will be described with reference to the drawings, based on an application to a motor generator (rotating electric motor) incorporated in a hybrid vehicle. However, the present invention is also applicable to a rotating electric motor incorporated in various types of vehicles other than a hybrid vehicle (for example, electric-driven vehicles including a fuel cell vehicle and electric vehicle) as well as to various equipment such as industrial equipment, air conditioning equipment, and environmental equipment.

In the embodiments, the same or corresponding elements have the same reference characters allotted. All of the constituent elements are not necessarily mandatory, and there are cases where some of the constituent elements can be omitted.

Figure 2:
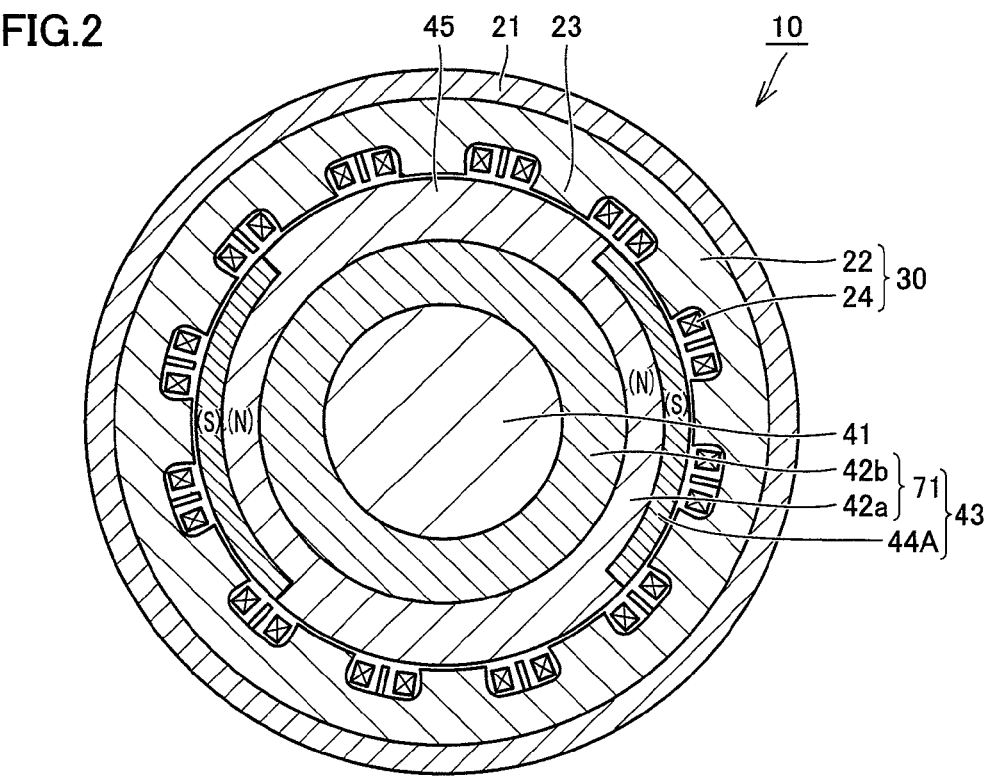
FIG. 2 is a sectional view taken along line II-II of FIG. 1.
Figure 3:
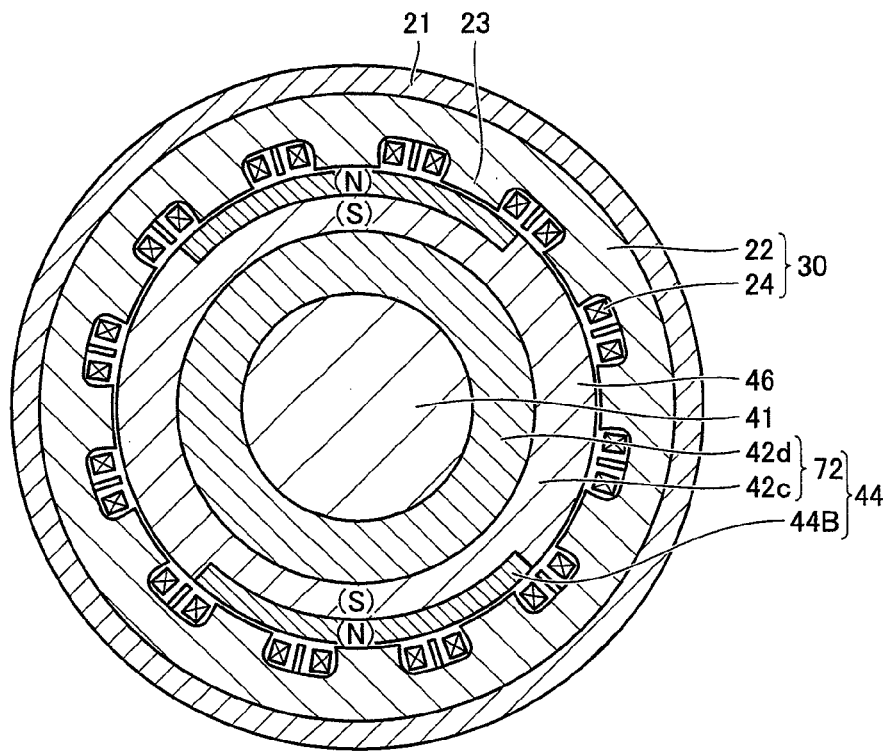
FIG. 3 is a sectional taken along line III-III of FIG. 1.

FIG. 1 is a side sectional view of a rotating electric motor 10 according to the present embodiment, and FIG. 2 is a sectional view taken along line II-II of FIG. 1. Further, FIG. 3 is a sectional view taken along line III-III of FIG. 1.

As shown in FIG. 1, rotating electric motor 10 includes a stator 30 formed in a cylindrical configuration, a field yoke 21 provided at the outer perimeter of stator 30, allowing a flow of magnetic flux, a rotational shaft 41 disposed in stator 30 in a rotatable manner, a rotor 70 fixedly installed at the outer surface of rotational shaft 41, and field coils (winding) 50A and 50B.

As shown in FIG. 2, stator 30 includes a cylindrical stator core 22 having stator teeth 23 formed at the inner circumferential face, and an armature winding 24 wound around stator teeth 23. As shown in FIGS. 1 and 2, rotor 70 includes an upper side rotor 43 fixedly installed on rotational shaft 41, and a lower side rotor 44 fixedly installed on rotational shaft 41, spaced apart from upper side rotor 43 in the axial direction of rotational shaft 41.

Upper side rotor 43 includes a rotor core (first rotor core) 71 fixedly installed on rotational shaft 41, having a plurality of rotor teeth 45 formed at the outer circumferential face, and a magnet 44A provided between rotor teeth 45.

Rotor core 71 includes a cylindrical outer side rotor core 42a, and an inner side rotor core 42b arranged at the inner circumference of outer side rotor core 42a, fixedly installed on rotational shaft 41.

Outer side rotor core 42a is formed having a plurality of magnetic steel plates (magnetic element) stacked in the axial direction. There is a slight gap between the magnetic steel plates of outer side rotor core 42a. Inner side rotor core 42b is formed of a compacted core. Therefore, the magnetic reluctance of inner side rotor core 42b in the axial direction is smaller than the magnetic reluctance of outer side rotor core 42a in the axial direction.

A plurality of rotor teeth 45 are formed spaced apart in the circumferential direction at the outer surface of outer side rotor core 42a. Rotor teeth 45 extend from one end to the other end in the axial direction of outer side rotor core 42a.

Magnet 44A is located alongside of rotor teeth 45 in the circumferential direction of rotor core 71, arranged to cover the outer surface of rotor core 71 located between rotor teeth 45.

As shown in FIG. 3, lower side rotor 44 includes a rotor core (second rotor core) 72 fixedly installed on rotational shaft 41, having a plurality of rotor teeth 46 at the outer circumferential face, and a magnet 44B provided between rotor teeth 46.

Rotor core 72 includes a cylindrical outer side rotor core 42c, and an inner side rotor core 42d arranged at the inner circumference of outer side rotor core 42c, fixedly installed on rotational shaft 41.

Outer side rotor core 42c is formed having a plurality of magnetic steel plates (magnetic element) stacked in the axial direction. There is a small gap between the magnetic steel plates of outer side rotor core 42c. Inner side rotor core 42d is formed of a compacted core. Therefore, the magnetic reluctance of inner side rotor core 42d in the axial direction is smaller than the magnetic reluctance of outer side rotor core 42c in the axial direction.

A plurality of rotor teeth 46 are formed spaced apart in the circumferential direction, on the outer surface of outer side rotor core 42c. Rotor teeth 46 extend from one end to the other end of outer side rotor core 42c in the axial direction.

Rotor teeth 46 is located deviating from rotor teeth 45 of FIG. 2 in the circumferential direction of rotor core 72. Namely, when viewed in plane from the direction of axis of rotational shaft 41, rotor teeth 46 is located between rotor teeth 45.

Although magnets 44A and 44B are provided at the surface of rotor cores 71 and 72, identified as the SPM (Surface Permanent Magnet) in the present embodiment, the IPM (Interior Permanent Magnet) may be employed with magnets 44A and 44B accommodated in rotor cores 71 and 72.

In FIG. 2, the magnetism of magnet 44A at the outer circumference corresponds to the S magnetic core, whereas the magnetism of magnet 44A at the inner circumferential side corresponds to the N magnetic pole. Specifically, the S magnetic pole is located at the inner side in the radial direction of rotor core 71, whereas the N magnetic pole is located at the outer side in the radial direction. As shown in FIG. 3, the magnetism of magnet 44B at the outer circumference corresponds to the N magnetic pole, whereas the magnetism at the inner circumference corresponds to the S magnetic pole. Namely, the S magnetic pole is located at the inner side in the radial direction, whereas the N magnetic pole is arranged at the outer side in the radial direction of rotor core 72. Thus, magnets 44A and 44B are arranged such that the magnetism of magnet 44A at the outer circumferential side differs from the magnetism side of magnet 44B at the outer circumferential.

Figure 4:
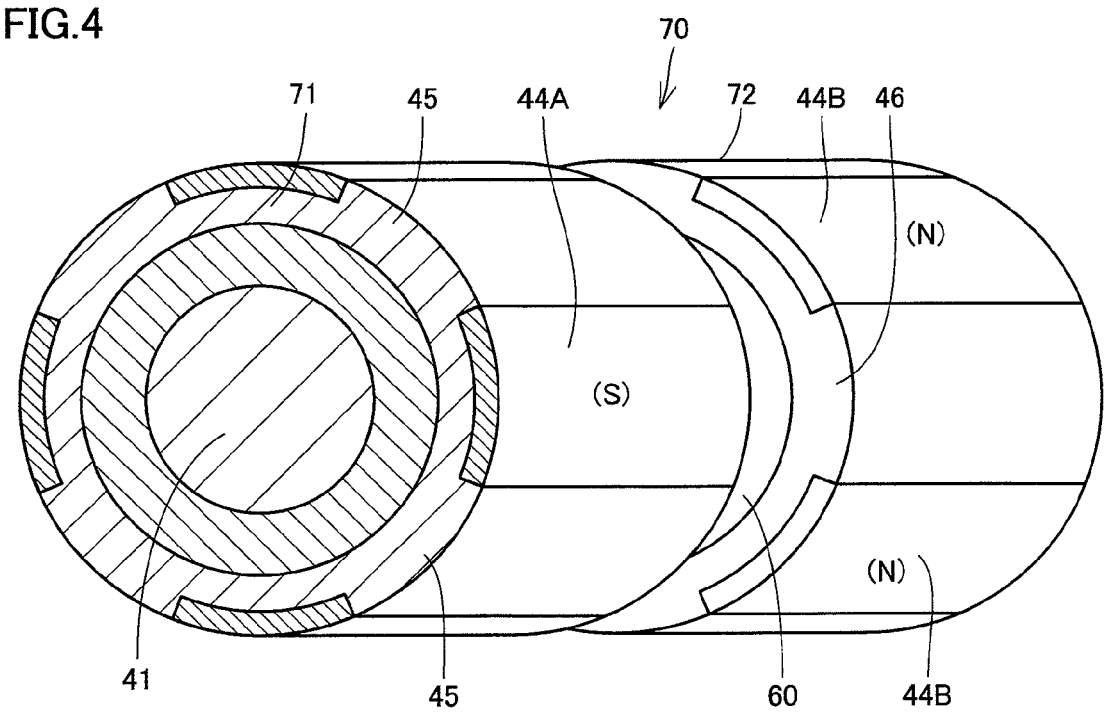
FIG. 4 is a perspective view of a rotor.

FIG. 4 is a perspective view of rotor 70. As shown in FIG. 4, rotor teeth 46 are located in the axial direction of rotational shaft 41 with respect to magnet 44A. Rotor teeth 45 are located in the axial direction of rotational shaft 41 with respect to magnet 44B.

Thus, magnets 44A and 44B are disposed deviated from each other in the circumferential direction of rotor cores 71 and 72.

Field yoke 21 in FIG. 1 is provided extending from one end to the other end of stator core 22 in the axial direction, and is formed of a compacted core (powder molded magnetic element (SMC: Soft Magnetic Composites)). Therefore, a magnetic flux flow can be provided in the axial direction, and the magnetic reluctance in the axial direction, circumferential direction, and radial direction are substantially equal in field yoke 21.

Field yoke 21 includes a projection 51 protruding towards upper side rotor 43 and lower side rotor 44. Particularly, projection 51 protrudes towards inner side rotor cores 42b and 42d. Field coils 50A and 50B are formed have a winding wound around projection 51.

Figure 5:
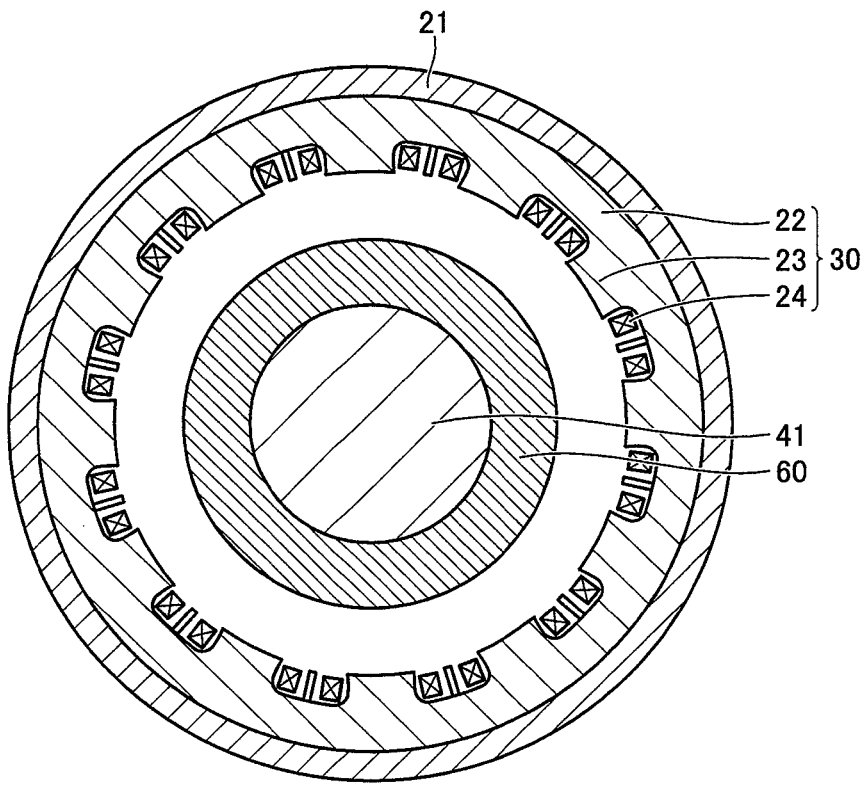
FIG. 5 is a sectional view taken along line V-V of FIG. 1.

FIG. 5 is a sectional view taken along line V-V of FIG. 1. As shown in FIG. 5 and FIG. 1, an annular ring magnet 60 is fixedly installed on the outer surface of rotational shaft 41 at the region located between rotor core 71 and rotor core 72. One pair of magnetic poles of ring magnet 60 are aligned in the axial direction of rotational shaft 41. The end face at the side of rotor core 71 corresponds to the N magnetic pole. The end face at the side of rotor core 72 corresponds to the S magnetic pole.

Particularly, the end face of ring magnet 60 in the axial direction is brought into contact with inner side rotor cores 42b and 42d. The outer diameter of ring magnet 60 is set smaller than the inner diameter of outer side rotor cores 42a and 42c.

Figure 6:
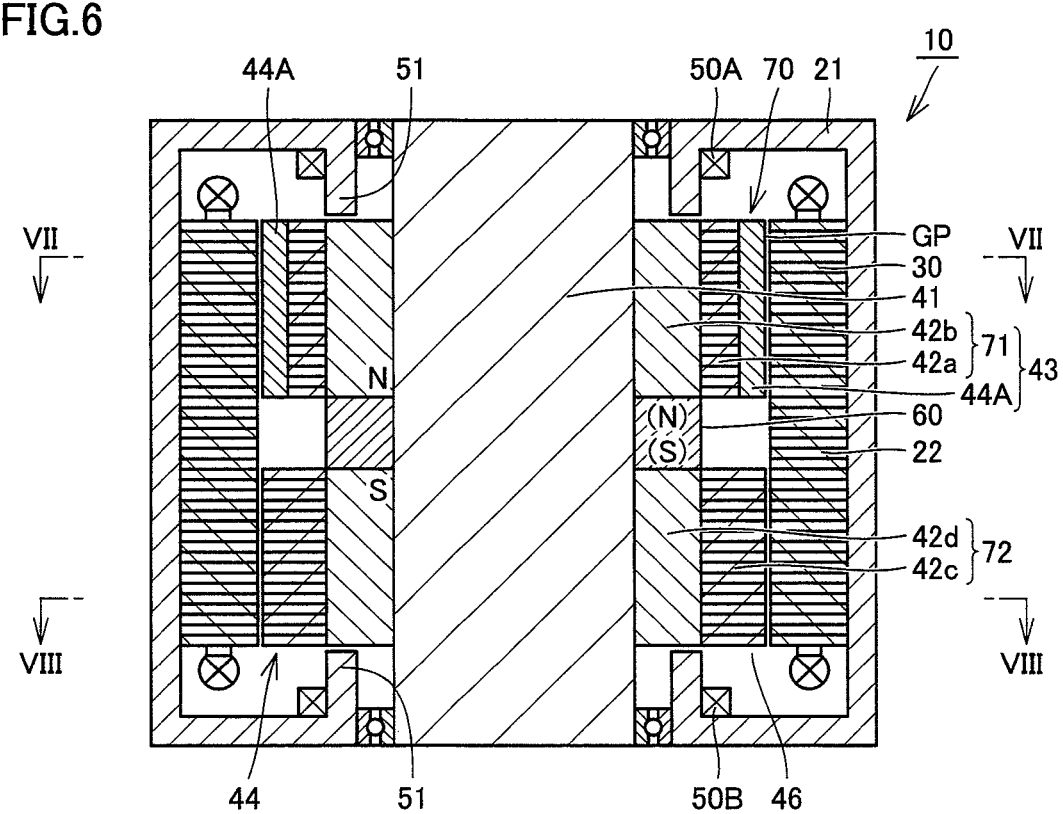
FIG. 6 is a side sectional view of a rotating electric motor when the so-called "field strengthening control" and "field weakening control" is not carried out in the present embodiment.
Figure 7:
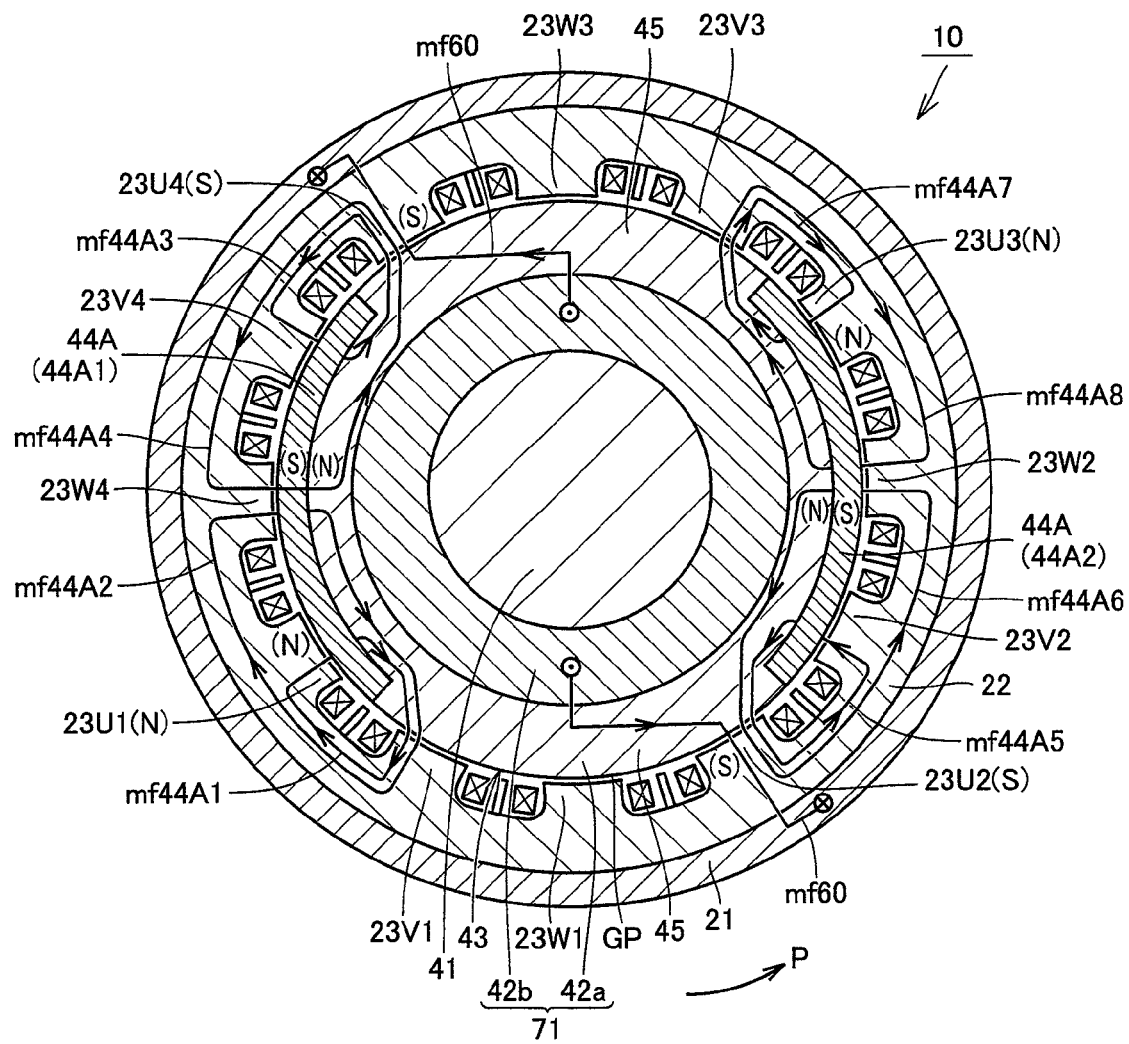
FIG. 7 is a sectional view taken along line VII-VII of FIG. 6.
Figure 8:
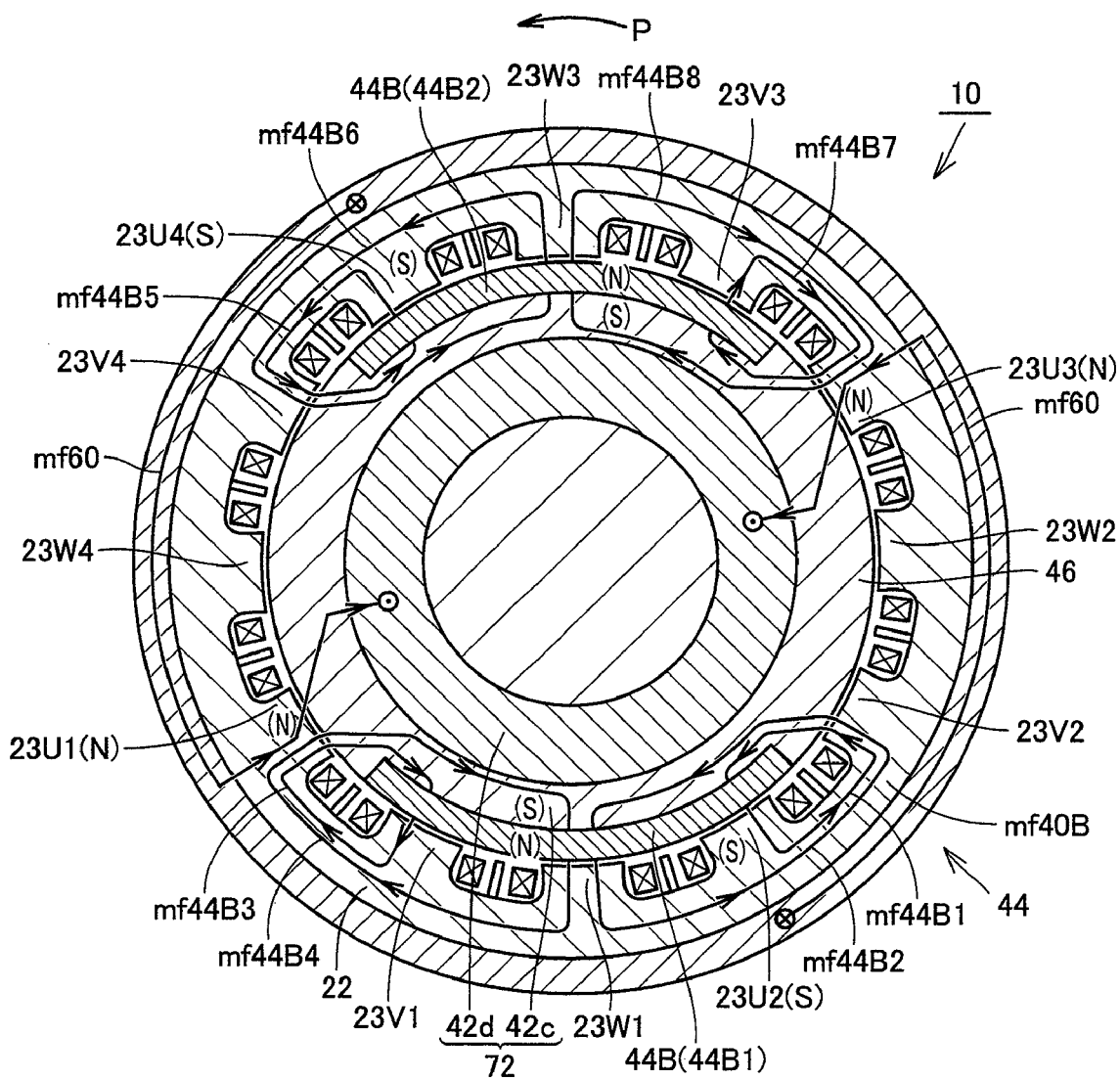
FIG. 8 is a sectional view taken along line VIII-VIII of FIG. 6.

Various operations of rotating electric motor 10 configured as set forth above will be described with reference to the drawings. FIG. 6 is a side sectional view of rotating electric motor 10 when any of the so-called "field strengthening control" and "field weakening control" is not carried out in the present embodiment. FIG. 7 is a sectional view taken along line VII-VII of FIG. 6. FIG. 8 is a sectional view taken along line VIII-VIII of FIG. 6.

Each flow of magnetic flux will be described in detail with reference to FIGS. 7 and 8. As shown in FIG. 7, rotating electric motor 10 is a 12-pole 3-phase 1-excitation motor. Stator core 22 has stator teeth 23U1-23U4 of the U-phase, stator teeth 23V1-23V4 of the V-phase, and stator teeth 23W1-23W4 of the W-phase formed in the circumferential direction. The U-phase is excited at the timing shown in FIG. 7. Stator teeth 23U1 and 23U3 correspond to the N magnetic pole. Stator teeth 23U2 and 23U4 correspond to the S magnetic pole.

The flow of magnetic flux mf60 from ring magnet 60 will be described based on the circumstances set forth above. Magnetic flux mf60 first proceeds in the axial direction in inner side rotor core 42b, and then is displaced radially at a site in inner side rotor core 42b to enter outer side rotor core 42a. Since inner side rotor core 42b is formed of a compacted core, the magnetic reluctance in inner side rotor core 42b is small. Therefore, magnetic flux mf60 can pass through favorably.

The magnetic flux mf60 entering outer side rotor core 42a from inner side rotor core 42b proceeds in the circumferential direction and radial direction in outer side rotor core 42a to arrive at rotor teeth 45. It is to be noted that the magnetic reluctance in the radial direction and circumferential direction is smaller than that in the axial direction since outer side rotor core 42a is formed of stacked steel plates. Therefore, diffusion of the magnetic flux in outer side rotor core 42a along the axial direction can be suppressed.

Then, the magnetic flux enters stator teeth 23U2 and 23U4 that is excited as the S magnetic pole via an air gap.

At this stage, stator teeth 23U2 and 23U4 are located at the forward side in the direction of rotation P of rotor 70 with respect to each of rotor teeth 45. Therefore, each of rotor teeth 45 is attracted towards the forward side in the direction of rotation P.

Magnetic flux mf60 entering each of stator teeth 23U2 and 23U4 is displaced in the radial direction and circumferential direction in stator core 22 to reach field yoke 21. Magnetic flux mf60 is displaced in field yoke 21 in the circumferential direction and axial direction towards the side of lower side rotary 44.

Referring to FIG. 8, magnetic flux mf60 proceeds to the forward side in the direction of rotation P in field yoke 21. Magnetic flux mf60 enters stator core 22, and runs from stator teeth 23U1 and 23U3 excited as the N magnetic pole into rotor teeth 46 via the air gap.

Since the center of rotor teeth 46 is located at the rear side in the direction of rotation with respect to stator teeth 23U1 and 23U3, rotor teeth 46 is attracted to stator teeth 23U1 and 23U3, rotating in the direction of rotation P.

Magnetic flux mf60 is displaced in inner side rotor core 42d in the radial direction, and returns to the S magnetic pole of ring magnet 60.

As shown in FIG. 7, magnet 44A provided at the surface of upper side rotor 43 includes magnets 44A1 and 44A2 arranged to face each other with rotational shaft 41 therebetween in the present embodiment.

Since magnets 44A1 and 44A2 are located at the backward side in the direction of rotation P than stator teeth 23U1 and 23U3 excited as the N pole, and the surface of magnets 44A1 and 44A2 at the outer side in the radial direction corresponds to the S pole, magnets 44A1 and 44A2 are attracted in the direction of rotation P. Therefore, upper side rotor 43 is attracted in the direction of rotation P.

First, magnetic fluxes mf44A1-mf44A4 from magnet 44A1 among magnetic fluxes mf44A1-mf44A8 from magnets 44A1 and 44A2 will be described. Magnetic fluxes mf44A1-mf44A4 from magnet 44A1 include magnetic fluxes mf44A1 and mf44A2 running towards the forward side in the direction of rotation P, and magnetic fluxes mf44A3 and mf44A4 running towards the backward side in the direction of rotation P.

Magnetic fluxes mf44A1 and mf44A2 enter outer side rotor core 42a from the surface of magnet 44A at the inward side in the radial direction of magnet 44A into outer side rotor core 42a to pass through outer side rotor core 42a towards the forward side in the direction of rotation P. Then, the magnetic flux enters stator teeth 23V1 from rotor teeth 45 via the air gap.

Magnetic fluxes mf44A1 and mf44A2 from stator teeth 23V1 pass through stator core 22 towards the backward side in the direction of rotation P. Then, the magnetic flux returns to magnet 44A1 from stator teeth 23U1 and 23W4 via the air gap.

Magnetic fluxes mf44A3 and mf44A4 enter outer side rotor core 42a from the surface of magnet 44A at the inward side in the radial direction to pass through outer side rotor core 42a towards the backward side in direction of rotation P. Then, the magnetic flux enters stator teeth 23U4 from rotor teeth 45 via the air gap.

Further, the magnetic flux runs towards the forward side in the direction of rotation P in stator core 22a. Then, magnetic fluxes mf44A3 and mf44A4 return to magnet 44A from stator teeth 23W4 and 23V4 via the air gap.

Magnetic fluxes mf44A5-mf44A8 from magnet 44A2 flow in a manner similar to that of the magnetic flux from magnet 44A1 set forth above.

The region through which magnetic flux mf60 from ring magnet 60 can flow through outer side rotor core 42a is defined within each of rotor teeth 45 by magnetic fluxes mf44A1-mf44A4 of magnet 44A1 and magnetic fluxes mf44A5-mf44A8 from magnet 44A2.

Accordingly, the flow of magnetic flux mf60 from ring magnet 60 towards stator core 22 from a region other than rotor teeth 45 can be suppressed, allowing reduction in the leakage of the magnetic flux. Thus, the rotation applied to upper side rotary 43 can be improved.

As shown in FIG. 8, magnet 44B provided at the surface of lower side rotor 44 includes magnets 44B1 and 44B2 arranged to face each other with rotational shaft 41 therebetween in the present embodiment.

Since the central regions of magnets 44B1 and 44B2 are located at the backward side in the direction of rotation P than stator teeth 23U2 and 23U4 excited as the S pole, and the surface of magnets 44B1 and 44B2 at the outer side in the radial direction corresponds to the N pole, magnets 44B1 and 44B2 are attracted in the direction of rotation P. Therefore, lower side rotor 44 is attracted towards the forward side in the direction of rotation P.

Here, magnetic fluxes mf44B1-mf44B4 from magnet 44B1 will be described. Magnetic fluxes mf44B1-mf44B4 from magnet 44B1 include magnetic fluxes mf44B1 and mf44B2 running towards the forward side in the direction of rotation P, and magnetic fluxes mf44B3 and mf44B4 running towards the backward side in the direction of rotation P.

Then, magnetic fluxes mf44B1 and mf44B2 enter stator teeth 23W1 and 23U2 via the air gap, and pass through stator core 22 towards the forward side in the direction of rotation P. Further, the magnetic flux enters rotor teeth 46 via the air gap from stator teeth 23V2, and then passes through outer side rotor core 42c towards the backward side in the direction of rotation P to return to magnet 44B.

Meanwhile, magnetic fluxes mf44B3 and mf44B4 enter stator teeth 23W1 and 23V1 via the air gap, and then pass through stator core 22 towards the backward side in the direction of rotation P. Then, the magnetic flux enters rotor teeth 46 via the air gap from stator teeth 23U1, for example. Further, the magnetic fluxes pass through outer side rotor core 42c towards the forward side in the direction of rotation P to return to magnet 44B1.

In a similar manner, magnetic fluxes mf44B5-mf44B8 flow from magnet 44B2. The region where magnetic flux mf60 from ring magnet 60 can enter outer side rotor core 42c from stator core 22 is limited to a region facing rotor teeth 46, among rotor teeth 46 and stator core 22, by magnetic fluxes mf44B1-mf44B4 of magnet 44B1 and magnetic fluxes mf44B5-mf44B8 of magnet 44B2.

Accordingly, the so-called leakage of magnetic flux can be reduced, allowing the rotation applied to lower side rotor 44 to be improved.

Figure 9:
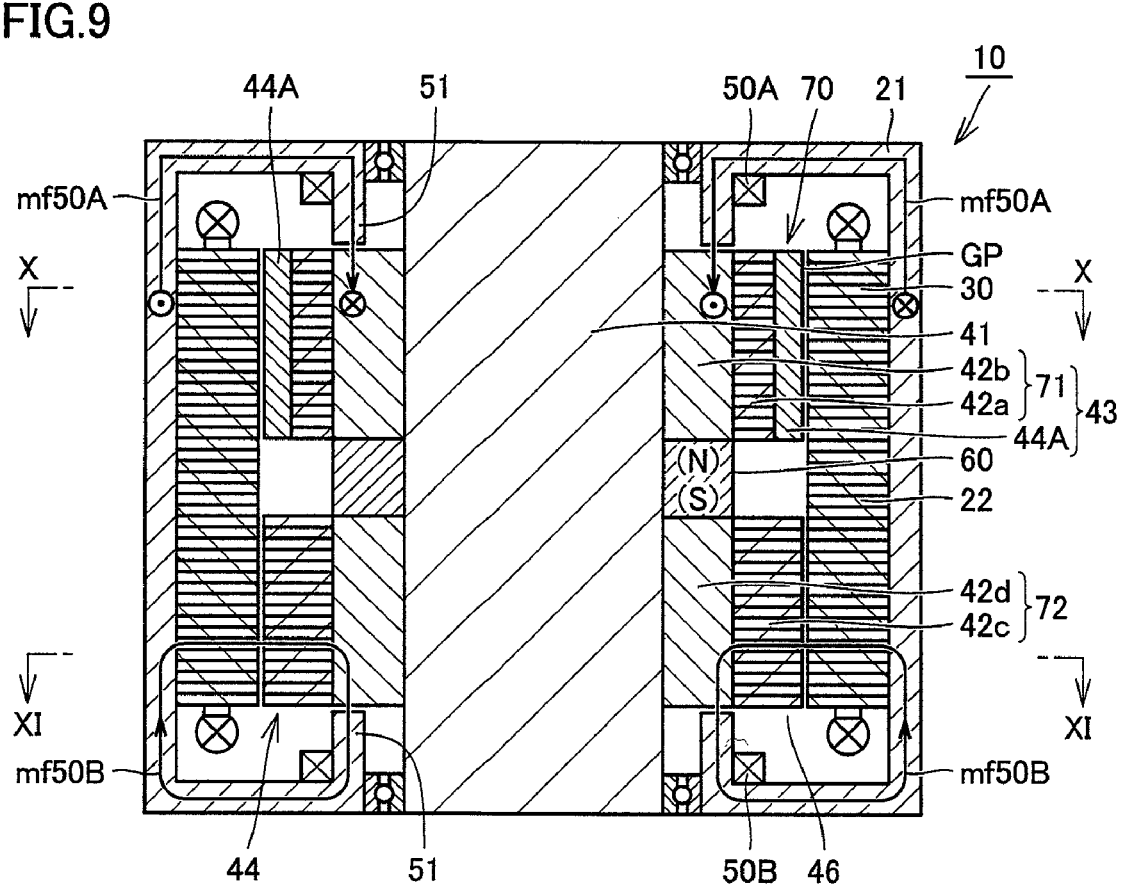
FIG. 9 is a side sectional view of a rotating electric motor when field strengthening control is carried out.

The field strengthening control of rotating electric motor 10 according to the present embodiment will be described with reference to FIGS. 9-11. FIG. 9 is a side sectional view when field strengthening control is carried out. As shown in FIG. 9, current is supplied to field coil 50A so as to form a magnetic circuit in which magnetic flux mf50A generated by field coil 50A enters inner side rotor core 42b from projection 51 of field yoke 21, and then arrives at field yoke 21 via air gap GP and stator core 22 from outer side rotor core 42a.

Further, current is supplied to field coil 50B so as to form a magnetic circuit in which magnetic flux mf50B generated by field coil 50B enters stator core 22 from the circumferential wall of field yoke 50, enters rotor core 72 via the air gap, and then enters projection 51 of field yoke 21 from the end of inner side rotor core 42d in the axial axial direction. Projection 51 is located approximate to inner side rotor cores 42b and 42d such that supply of magnetic fluxes mf50A and mf50B to inner side rotor cores 42b and 42d are allowed.

Figure 10:
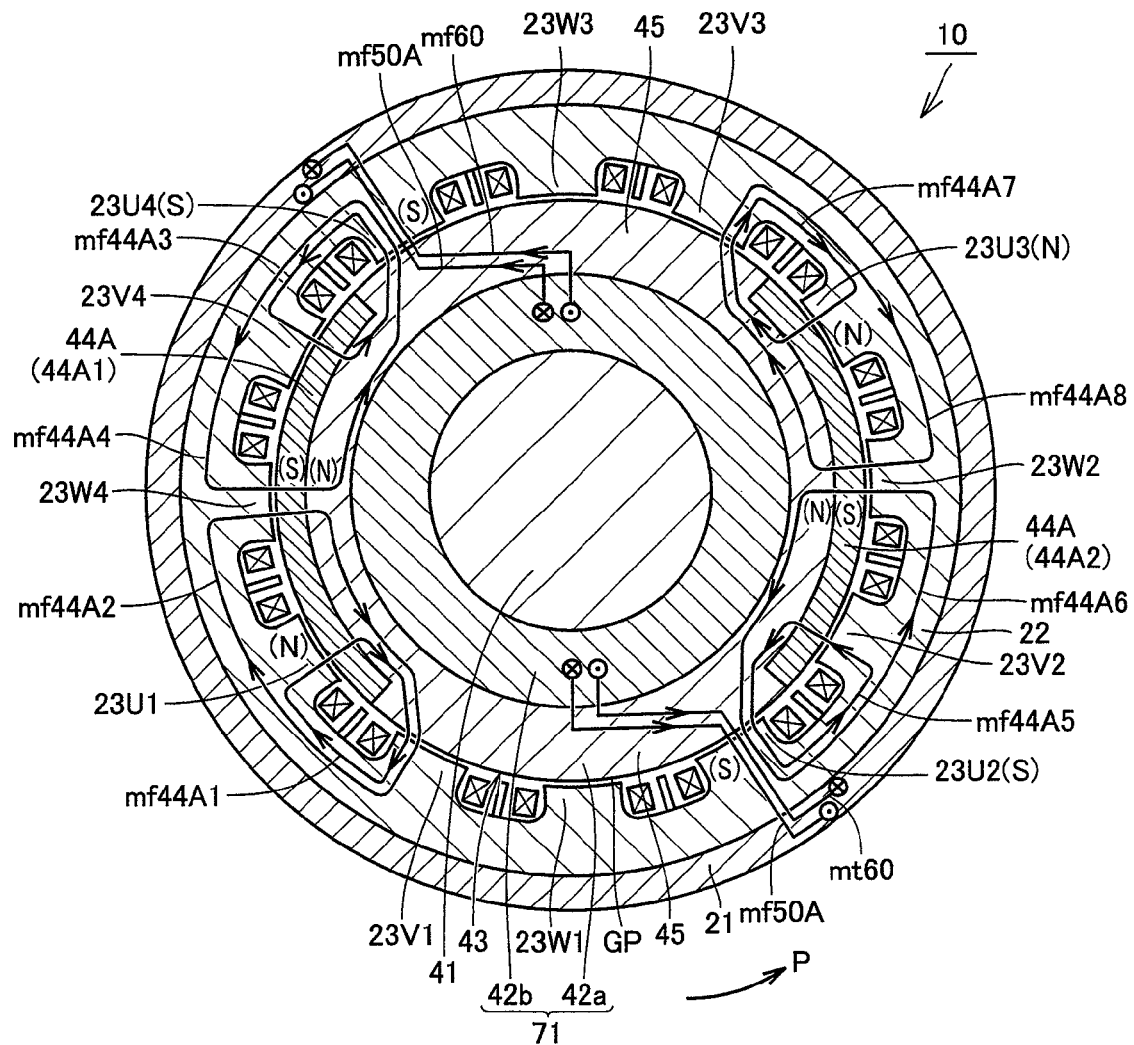
FIG. 10 is a sectional view taken along line X-X of FIG. 9.

FIG. 10 is a sectional view taken along line X-X of FIG. 9. FIG. 11 is a sectional view taken along line XI-XI of FIG. 9.

Since inner side rotor cores 42b and 42d of FIGS. 10 and 9 are formed of compacted magnetic cores, having the magnetic reluctance reduced, magnetic fluxes mf50A and mf50B can flow favorably in the radial direction, axial direction, and circumferential direction of inner side rotor cores 42b and 42d.

Magnetic flux mf50A running in inner side rotor core 42b enters outer side rotor core 42a to arrive at rotor teeth 45. Then, the magnetic flux arrives at stator teeth 23U2 and 23U4 from rotor teeth 45 via the air gap.

Namely, since magnetic flux mf50A reaches stator teeth 23U2 and 23U4 from rotor teeth 45, likewise with magnetic flux mf60 from ring magnet 60, lower side rotor 44 is accelerated in the direction of rotation P in cooperation with magnetic flux mf60.

This allows rotor 70 to generate large torque when the revolution speed of rotor 70 is low. As shown in FIG. 9, magnetic flux mf50A arriving at stator core 22 enters field yoke 21 to arrive at projection 51 again.

Figure 11:
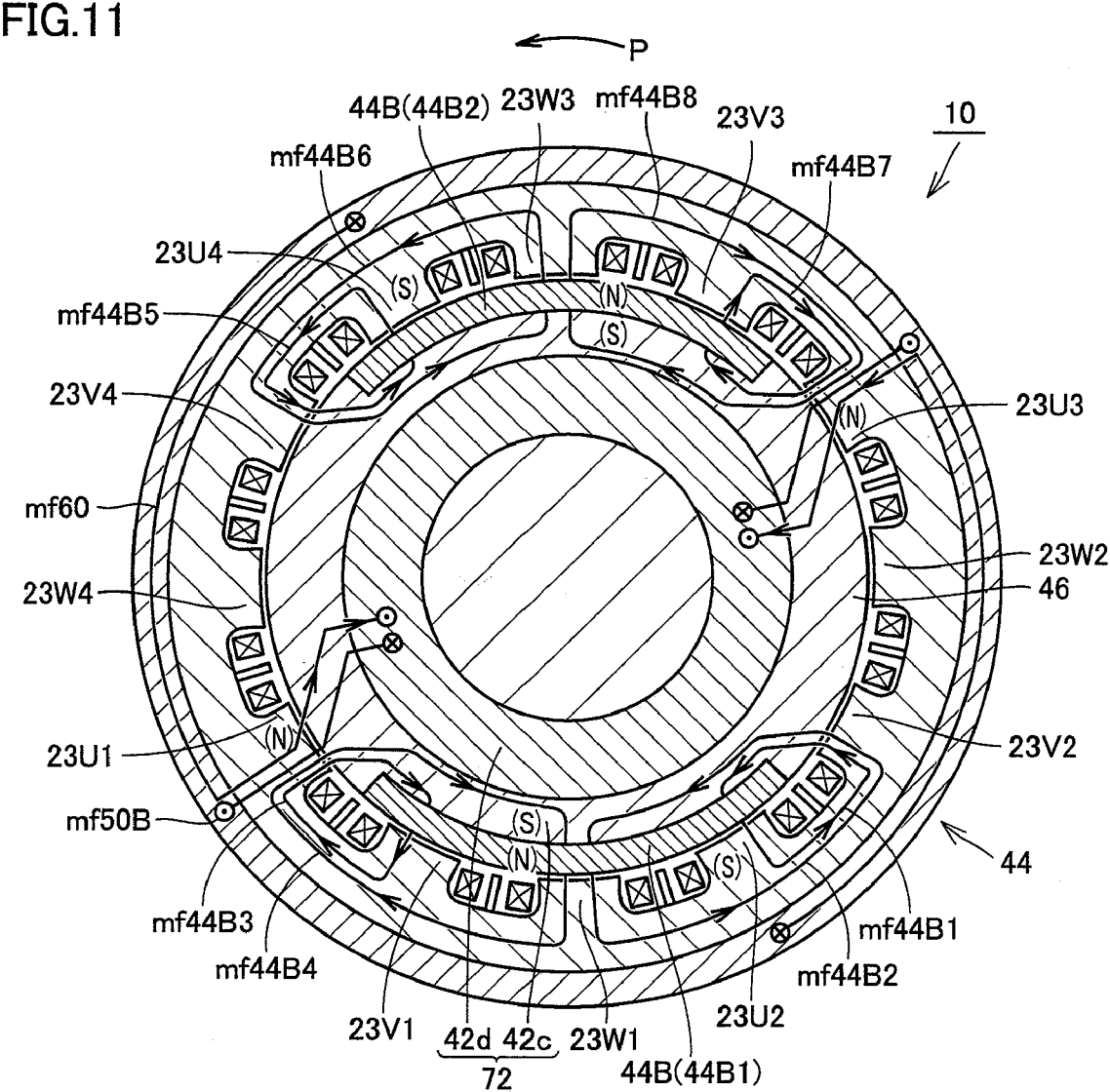
FIG. 11 is a sectional view taken along line XI-XI of FIG. 9.

As shown in FIG. 11 and FIG. 9, at the side of lower side rotor 44, magnetic flux mf50B enters stator core 22 from field yoke 21, and then runs into rotor teeth 46 via the air gap from stator teeth 23U1 and 23U3.

In other words, magnetic flux mf50B passes through a path similar to that of magnetic flux mf60 of ring magnet 60 to accelerate lower side rotor 44 in the direction of rotation P. Magnetic flux mf50B entering rotor teeth 46 then runs into inner side rotor core 42d to be displaced in the axial direction therein, and returns to field yoke 21 from projection 51.

Figure 13:
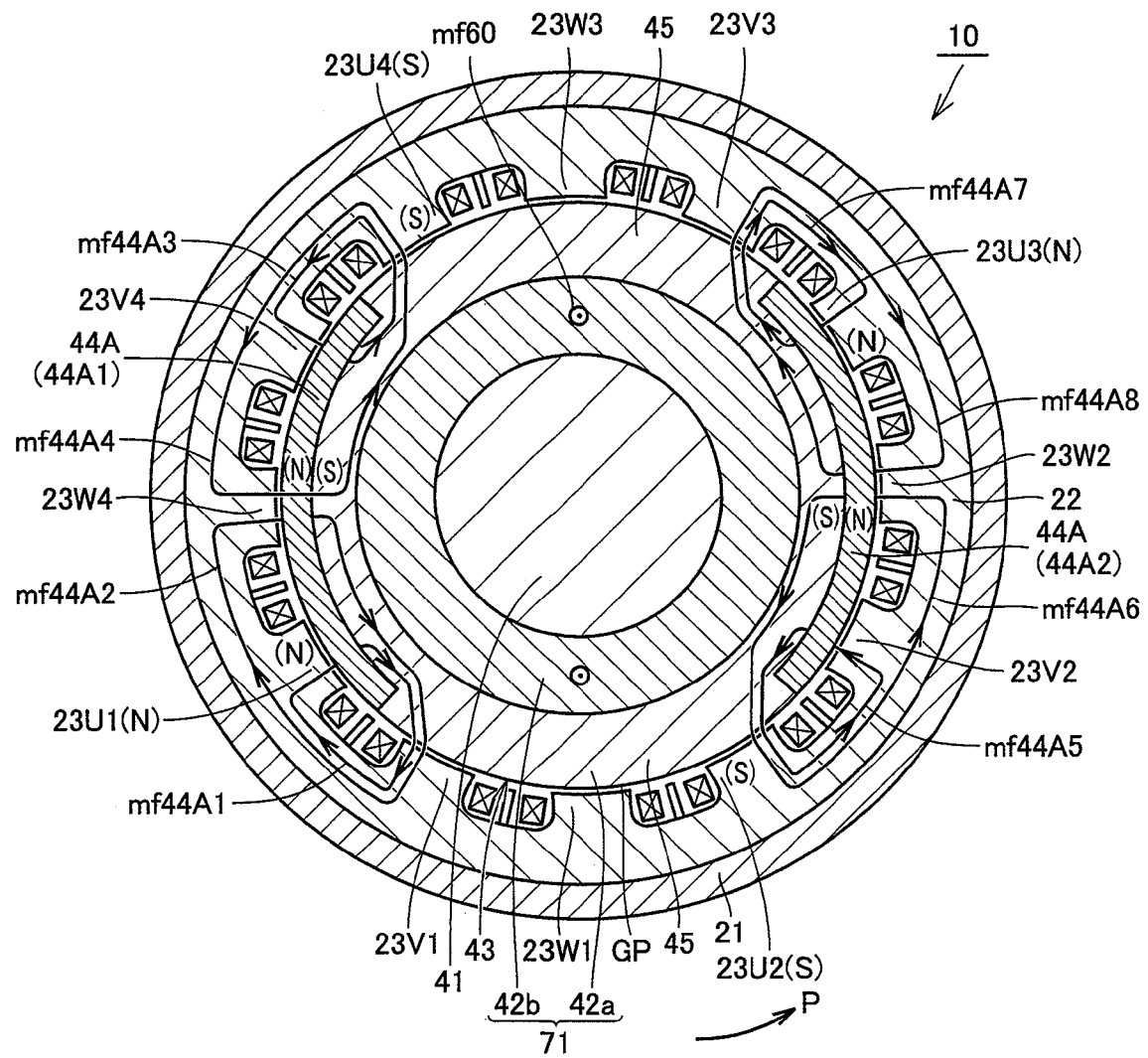
FIG. 13 is a sectional view taken along line XIII-XIII of FIG. 12.
Figure 14:
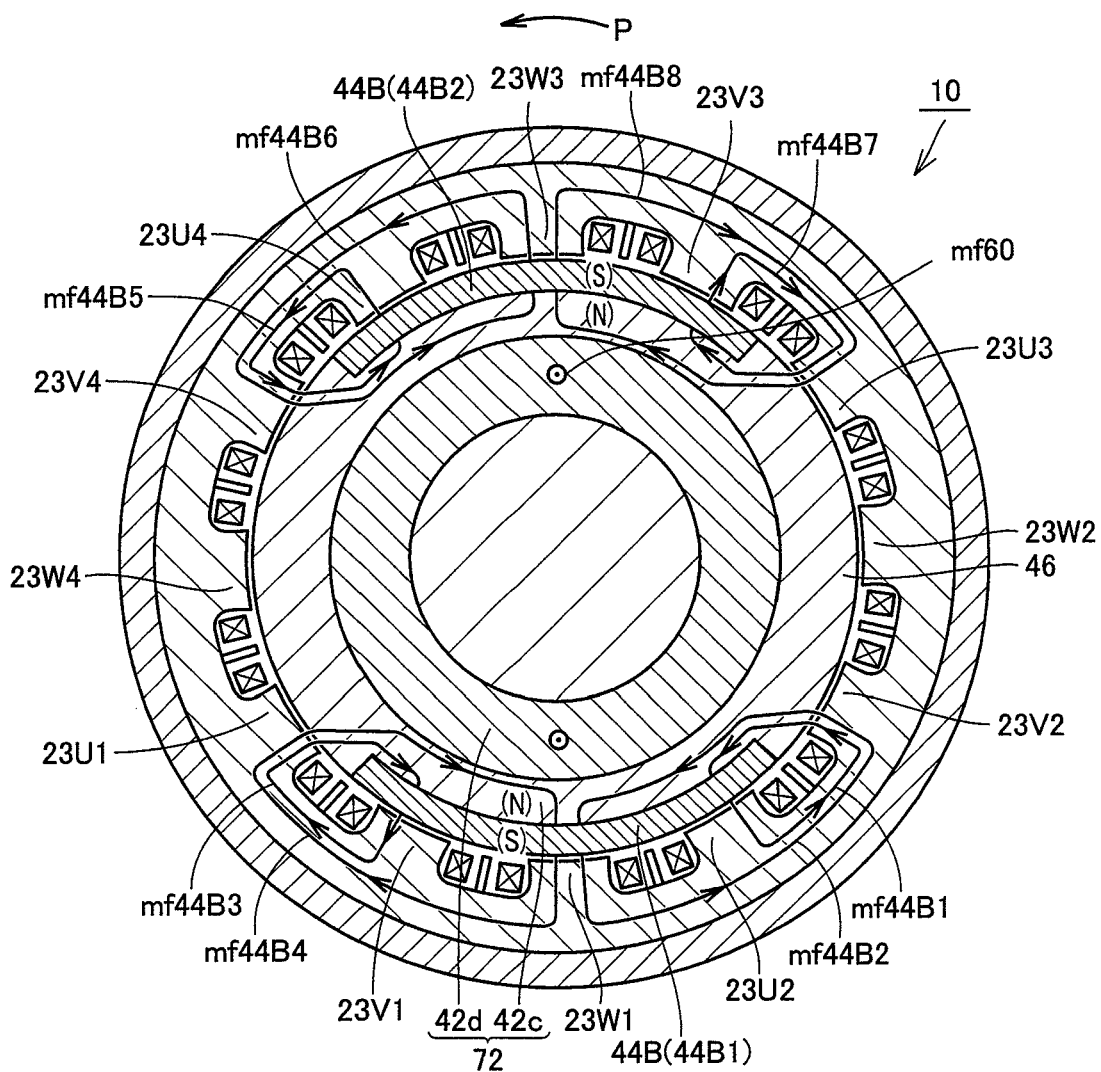
FIG. 14 is a sectional view taken along line XIV-XIV of FIG. 12.

Field weakening control of rotating electric motor 10 according to the present embodiment will be described with reference to FIGS. 12-14.

Figure 12:
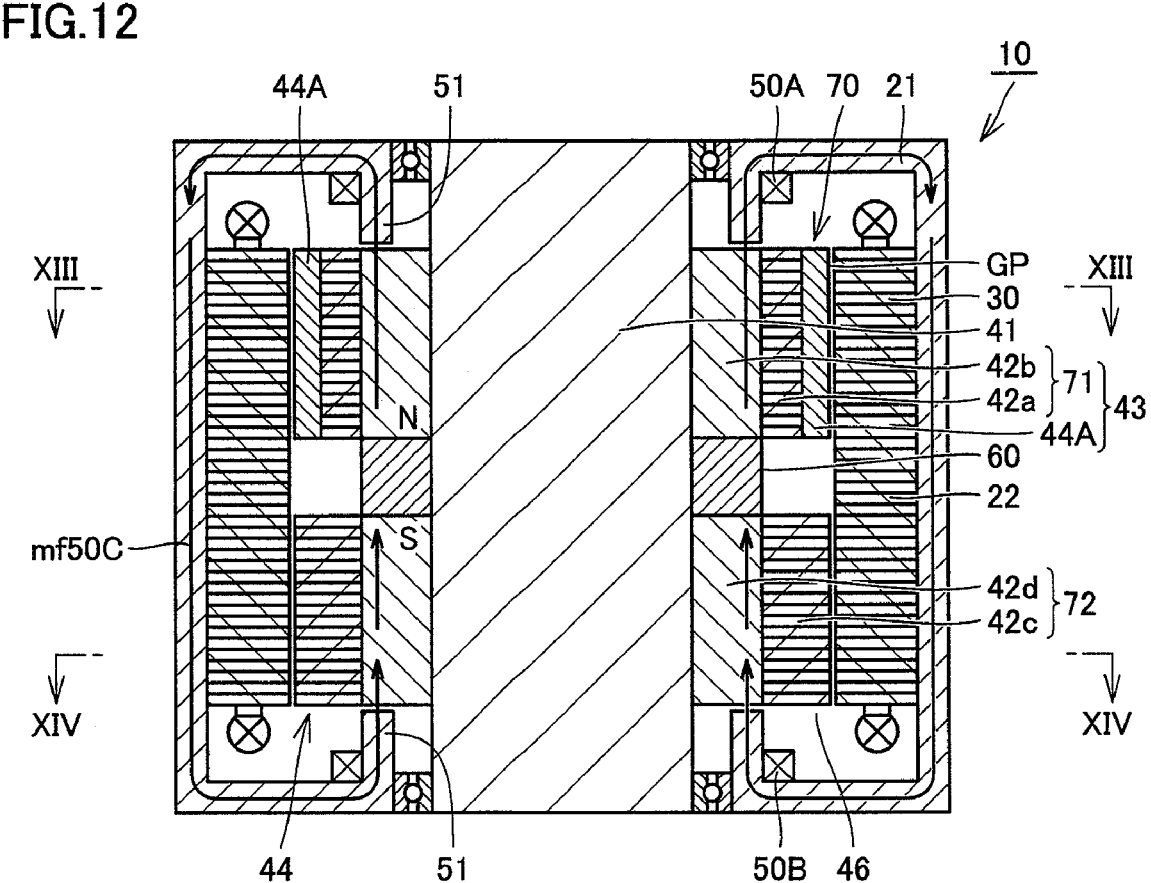
FIG. 12 is a side sectional view of a rotating electric motor when field weakening control is carried out.

FIG. 12 is a side sectional view of rotating electric motor 10 in a field weakening control mode. FIG. 13 is a sectional view taken along line XIII-XIII of FIG. 12. FIG. 14 is a sectional view taken along line XIV-XV of FIG. 12. As shown in FIG. 12, current is supplied to field coils 50A and 50B so that magnetic flux mf50C generated by field coils 50A and 50B passes through a magnetic circuit sequentially from projection 51 at upper side rotor 43 side, the top region of field yoke 21 at upper side rotor 43 side, the circumferential wall of field yoke 21, the top region of field yoke 21 at lower side rotor 44 side, projection 51, inner side rotor core 42d, ring magnet 60, inner side rotor core 42b, and projection 51 at upper side rotor 43 side.

By the flow of magnetic flux mf50C, at least a portion of magnetic flux mf60 from ring magnet 60 flows into the magnetic circuit of magnetic flux mf50C.

Accordingly, the amount of magnetic flux mf60 of ring magnet 60 flowing between rotor 70 and stator 30 is reduced.

Specifically, a portion of magnetic flux mf60 running into inner side rotor core 42b from the N magnetic pole of ring magnet 60 advances in the axial direction of inner side rotor core 42b to enter field yoke 21 from projection 51. Then, the magnetic flux runs into the circumferential wall of field yoke 21 from the top region of field yoke 21 at the upper side rotor 43 side to arrive at the top region at lower side rotor 44 side and runs into inner side rotor core 42d from projection 51. Further, the magnetic flux runs through inner side rotor core 42d in the axial direction to enter the S pole of ring magnet 60. For example, in upper side rotor 43 in the example shown in FIG. 13, magnetic flux mf60 from ring magnet 60 advances in the axial direction in inner side rotor core 42b. In lower side rotor 44 in the example of FIG. 14, magnetic flux mf60 from ring magnet 60 advances in the axial direction in inner side rotor core 42b.

Thus, a portion of magnetic flux mf60 generated from ring magnet 60 returns to ring magnet 60 again without passing through the path between the rotor teeth and the stator teeth, so that the amount of magnetic flux running through the path between the rotor teeth and stator teeth is reduced.

Reduction in the amount of magnetic flux running through the path between the rotor teeth and stator teeth will cause reduction in the amount of variation in the magnetic flux passing through armature winding 24 shown in FIG. 2 and the like. Such reduction in the amount of variation in the magnetic flux passing through armature winding 24 can reduce the armature counteraction occurring at armature winding 24.

Therefore, the voltage at armature winding 24 generated by the armature counteraction can be reduced in the case where the voltage generated at armature winding 24 by the armature counteraction resulting from the high revolution speed of rotor 70 approximates the voltage supplied to rotating electric motor 10 via an inverter or the like from the battery of, for example, a hybrid vehicle or electric vehicle. Accordingly, the voltage generated in the armature winding by the armature counteraction can be reduced, allowing the power in the direction opposite to the direction of rotation P applied to the rotor by the present voltage to be reduced.

Moreover, current can be supplied to armature winding 24, allowing the revolution speed of rotor 70 to be further improved.

In the present embodiment, the magnetic pole at the end face of ring magnet 60 is set to differ from the magnetic pole at the outer surface side of magnets 44A and 44B provided at rotor cores 71 and 72 in contact with the end face in the present embodiment.

It should be understood that the embodiments disclosed herein are illustrative and non-restrictive in every respect. The scope of the present invention is defined by the appended claims, and all changes that fall within limits and bounds of the claims, or equivalent thereof are intended to be embraced by the claims. In addition, the numeric values set forth above are by way of example only, and not restrictive.

INDUSTRIAL APPLICABILITY

The present invention is suitable for a rotating electric motor.

The invention claimed is:

1. A rotating electric motor comprising:
a stator core formed in a cylindrical configuration,
a rotational shaft disposed in said stator core in a rotatable manner,
a field yoke provided at a perimeter of said stator core, extending from one end to the other end of said stator core in an axial direction, allowing a flow of magnetic flux in the axial direction of said stator core,
a first rotor core fixedly installed on said rotational shaft,
a second rotor core fixedly installed on said rotational shaft, spaced apart from said first rotor core in the axial direction of said rotational shaft,
a first magnet fixedly installed on said rotational shaft at a region located between said first rotor core and said second rotor core, and having a pair of magnetic poles aligned in the axial direction of said rotational shaft,
a first rotor teeth formed at an outer surface of said first rotor core, protruding outwardly in a radial direction,
a second magnet provided alongside of said first rotor teeth in a circumferential direction of said first rotor core,
a second rotor teeth formed at an outer surface of said second rotor core, protruding outwardly in the radial direction, deviated from said first rotor teeth in the circumferential direction of said second rotor core,
a third magnet provided alongside of said second rotor teeth in the circumferential direction of said second rotor core, and
a winding allowing control of density of magnetic flux between at least one of said first rotor core and said second rotor core and said stator core by selectively forming a first magnetic circuit and a second magnetic circuit,
said first magnetic circuit having a path running through said first rotor core in said axial direction, arriving at said field yoke, passing through said field yoke, and running through said second rotor core in said axial direction from an end of said second rotor core,
said second magnetic circuit including at least one of a path arriving at said stator core from said first rotor teeth via an air gap, and a path from said stator core, arriving at said second rotor teeth via the air gap.

2. The rotating electric motor according to claim 1, wherein said second magnet and said third magnet are arranged such that a polarity at an outer circumferential face of said second magnet differs from the polarity at the outer surface of said third magnet.

3. The rotating electric motor according to claim 1, wherein said second magnet extends from one end to the other end of said first rotor core in the axial direction, and said third magnet extends from one end to the other end of said second rotor core in the axial direction.

4. The rotating electric motor according to claim 1, wherein said first rotor core includes a first outer side rotor core in cylindrical form, and a first inner side rotor core provided at an inner circumference of said first outer side rotor core, having magnetic reluctance in the axial direction smaller than the magnetic reluctance of said first outer side rotor core in the axial direction, and said second rotor core includes a second outer side rotor core in cylindrical form, and a second inner side rotor core provided at the inner circumference of said second outer side rotor core, having magnetic reluctance in the axial direction smaller than the magnetic reluctance of said second outer side rotor core in the axial direction.

5. The rotating electric motor according to claim 4, wherein said first inner side rotor core and said second inner side rotor core include an integral magnetic material in the axial direction of each said rotor core, and said first outer side rotor core and said second outer side rotor core are formed having a plurality of magnetic steel plates stacked in the axial direction of each said rotor core.

\* \* \* \* \*